Oct. 24, 1939.　　　F. MARTINDELL　　　2,177,457

STRAND HANDLING APPARATUS

Filed May 14, 1938

INVENTOR
F. MARTINDELL
BY Emery Robinson,
ATTORNEY

Patented Oct. 24, 1939

2,177,457

UNITED STATES PATENT OFFICE

2,177,457

STRAND HANDLING APPARATUS

Frank Martindell, Western Springs, Ill., assignor to Western Electric Company, Incorporated, New York, N. Y., a corporation of New York Application May 14, 1938, Serial No. 207,941

5 Claims. (Cl. 140—126)

This invention relates to strand handling apparatus, and more particularly to an automatic stop mechanism for strand winding apparatus.

During the operation of electrical coil winding machines it is desirable that an operator should be relieved from watching the strand supplies thereof in order to detect the approach of exhaustion of the strand supply so that the machine may be stopped with the end of the strand supply still wound on the spool to facilitate the insertion and connection of additional strand supply. Thus, by relieving the operator of the duty of watching the strand supplies the operator is able to attend additional machines, thereby increasing the efficiency of the operator.

An object of this invention is to provide a simple, efficient and practical stop mechanism for strand winding machines effective for automatically stopping the machine on the approach of the end of the strand wound on the spool and before the end is withdrawn from the spool.

In accordance with the above object, the invention in one embodiment thereof as applied to coil winding machines, in which a strand wound on a metal supply spool is drawn therefrom and wound on a core fixed to rotate with a motor driven winding spindle, includes a stop mechanism comprising a contact roller bearing upon the strand wound on the supply spool, the roller being included in an electrical stopping circuit. In case the strand supply is insulated wire, upon exposure of the conducting spool core the roller will make contact therewith to close the circuit and energize a relay, the armature contacts of which upon being closed control a circuit to a solenoid, the energization of which effects an opening of a circuit to the motor which drives the winding spindle and applies a brake thereto. In case the strand is bare, or uninsulated wire, a layer of insulating material is wound on the spool core and the stopping circuit will be arranged so that upon the roller contacting the insulating material the relay circuit which has been closed will be opened and in the manner heretofore described the winding spindle will be stopped. When the spool holds more than one length of wire, a layer of metal foil in the case of insulated wire or insulating material in the case of bare wire is inserted in the supply where the intermediate ends of the wires are located to serve as a false spool core and effect the stopping of the winding spindle in a manner similar to that heretofore described.

Other objects and advantages of this invention will more fully appear from the following detailed description taken in connection with the accompanying drawing, in which—

Figure 1:
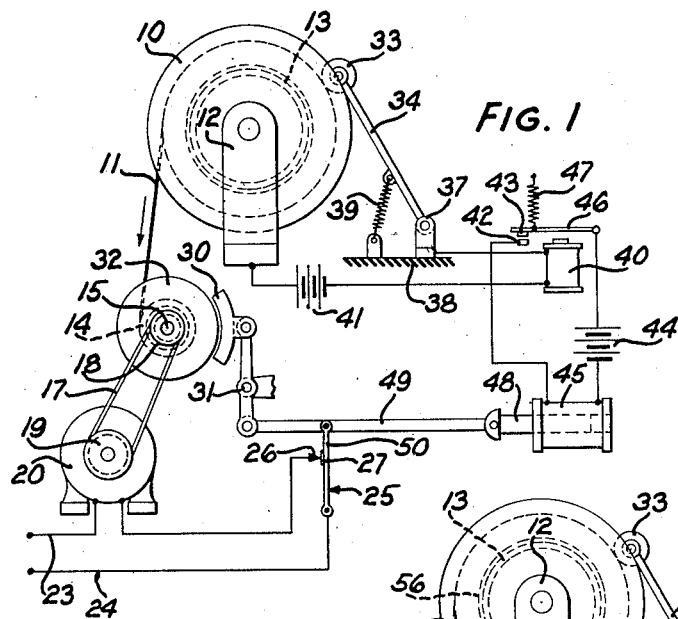
Fig. 1 is a schematic representation of a strand handling apparatus embodying the features of this invention applied to the handling of an insulated strand.

Referring to the drawing, particularly to Fig. 1, in which one embodiment of the invention is shown applied to a coil winding machine handling insulated strand, a metal spool is indicated at 10 having wound thereon a supply of electrically insulated wire 11, the spool being journaled for rotation on a metal standard 12. The wire 11 is drawn from a core or drum 13 of the spool 10 and wound upon a core 14 arranged to rotate with a winding spindle 15. The spindle 15 receives motion from a belt 17 passing at one end around a sheave 18 secured to the spindle 15, the opposite end of the belt passing around a sheave 19 secured to the shaft of an electric motor 20. The circuit for operating the motor 20 includes line wires 23 and 24, which are connected to a suitable source of electrical power (not shown), and a switch 25 having stationary and movable contacts 26 and 27, respectively. A manually actuated switch (not shown) is connected across the line wires 23 and 24 for connecting the source of electrical power to the motor circuit. A brake member 30, pivoted at 31, is arranged to be moved into pressing engagement with the periphery of a collar or flange 32 carried by the winding spindle 15 in order to quickly stop the rotation thereof when the operating circuit of the motor 20 is opened by the breaking of the switch contacts 26 and 27 in a manner to be presently described.

Bearing upon the periphery of the wire 11 wound on the supply spool 10 and arranged between and spaced from the spool heads is a contact roller 33 journaled on the free end of an arm 34 pivoted at 37 and electrically insulated, as indicated at 38, from the machine frame (not shown). A spring 39 also electrically insulated from the machine frame and attached to the arm 34 serves to hold the contact roller 33 with a light pressure against the periphery of the supply of wire on the spool. A relay 40 has one side of its winding connected through the arm 34 to the contact roller 33 and has the other side of its winding connected to one side of a source of electric current 41, the other side of the current source being connected through the standard 12 to the spool 10. The relay 40 is adapted upon energization to close a pair of stationary and movable contacts 42 and 43 for connecting a source of electric current 44 to the winding of a solenoid 45 to energize it, the movable contact 43 being carried by an armature 46 of the relay. A spring 47 normally holds the armature 46 in a retracted position to hold its contact 43 away from the stationary contact 42. From the foregoing it will be apparent that as soon as the contact roller 33 engages the spool 10 the solenoid 45 will be energized and a core 48 thereof will be actuated. A link 49 pivotally connected to the solenoid core 48 is likewise connected at its opposite end to the brake member 30 and intermediate its ends the link is pivotally connected to a pivotal arm 50 which carries the movable contact 27 of the switch 25.

In the application of the invention shown in Fig. 1, the circuit for the relay 40 is normally open, but during the withdrawal of the last layer of insulated wire 11 wound on the spool core 13 and before the end of the wire is withdrawn therefrom the contact roller 33, which has gradually moved toward the spool core, will engage the core and the relay circuit will be closed. The closed circuit may be traced from one side of the source of electric current 41, through the standard 12, spool 10, contact roller 33, arm 34, the winding of the relay 40, and back to the other side of the current source 41. The energization of the relay 40 draws the armature 46 carrying the contact 43 downward against the action of the spring 47, the contact 43 engaging the contact 42. Thus, the circuit for the solenoid 45 will be closed through the contacts 42 and 43 and the energization of the solenoid draws the core 48 thereof towards the right (Fig. 1) and with it the connected link 49. This movement of the link 49 carries with it the arm 50 of the motor circuit switch 25 and thus the switch contacts 26 and 27 are opened. Simultaneously therewith the brake member 30 is rocked counterclockwise about its pivot 31 and is pressed against the periphery of the spindle flange 32 and thus quickly stopping the rotation of the spindle 15.

Figure 2:
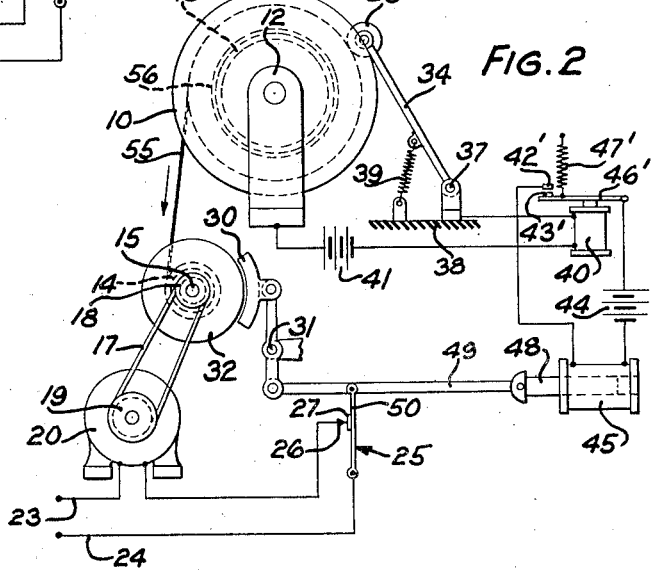
Fig. 2 is a similar representation showing the invention applied to the handling of a bare strand.

In the application of the invention shown in Fig. 2 for handling bare or uninsulated wire 55 in a coil winding machine, a layer of insulating material 56 is wound on the metal spool core 13 in line with the contact roller 33, so that the roller will engage therewith on the approach of the end of the wire wound on the spool and before the end is withdrawn therefrom, the insulating material being positioned on the spool core before the wire is wound thereon. As shown in Fig. 2 the circuit for the relay 40 is normally closed and may be traced from one side of the current source 41 through the standard 12, spool 10, bare wire 55, contact roller 33, arm 34, the winding of the relay 40 and back to the other side of the current source 41. With the relay 40 energized, movable contact 43' carried by the relay armature 46' will be held away from the stationary contact 42', against the action of the spring 47', and the circuit for the solenoid 45 will consequently be held open. This maintains the circuit for operating the motor 20 which drives the winding spindle 15 closed and the brake member 30 disengaged from the winding spindle flange 32.

During the withdrawal of the last layer of bare wire 55 from the spool 10 the contact roller 33 will move into engagement with the insulating material 56 and the closed circuit through the relay 40 will be broken. The de-energization of the relay 40 permits the spring 47' to draw the relay armature 46' upwardly, thus closing the circuit for the solenoid 45 through the contacts 42' and 43' and the energization of the solenoid opens the motor circuit and applies the brake member 30 to the winding spindle 15 in a manner similar to that heretofore described in connection with the application of the invention shown in Fig. 1.

Figure 3:
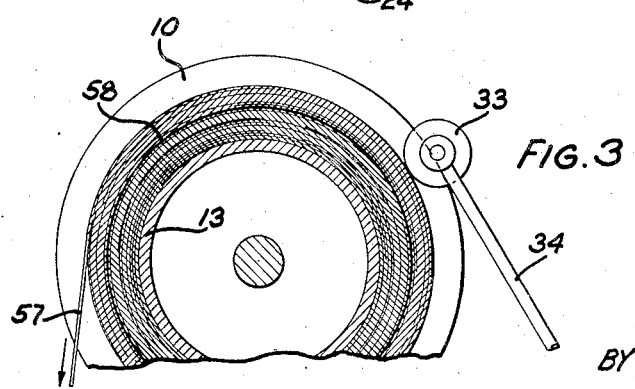
Fig. 3 is a fragmentary schematic sectional representation on an enlarged scale of a supply spool having more than one length of strand wound thereon and a layer of metal foil or paper, as the case may be, inserted therein to serve as a false spool core.

Fig. 3 illustrates fragmentarily an application of the invention in which the supply spool 10 carries more than one length of wire 57, either of the insulated or uninsulated type, the spool having been originally wound in this manner without joining the intermediate ends of the wires. During the winding of this type of wire on a supply spool, particularly where the wire is to be wound into coils on a winding machine embodying the automatic stop mechanism of this invention, a layer of metal foil in the case of insulated wire or a layer of insulating material in the case of uninsulated wire is inserted in the wire supply on the spool along the area where the intermediate ends of the wires are located to serve as a false spool core or drum. The position of the layer of metal foil or of insulating material in the supply of wire carried by the spool 10 is indicated by the numeral 58. The winding spindle 15 will be stopped and the brake member 30 applied thereto when the contact roller 33 engages the layer of metal foil or of insulating material 58 in a manner similar to that hereinbefore described in connection with the applications of the invention shown in Figs. 1 and 2 for insulated and uninsulated wire, respectively.

Although the invention herein described and illustrated is particularly well adapted for use in coil winding machines, it will be understood that the invention is capable of many other modifications and applications and is to be limited only by the scope of the appended claims.

What is claimed is:

1. In a strand handling apparatus including means for drawing insulated strand from a supply wound on a rotary electric conducting member, means for driving said strand drawing means including electric motive means and an operating circuit for said motive means, a normally open circuit including said rotary conducting member and conducting means engaging the periphery of the strand supply arranged to move toward the periphery of the rotary member as the strand supply diminishes and to contact the same as exhaustion of the strand is approached thereby closing said latter circuit, and means including a solenoid and an operating circuit for said solenoid responsive to the closing of said latter circuit to effect an opening of the motor operating circuit and thereby a stoppage of said driving means.

2. In a strand handling apparatus including means for drawing uninsulated strand from a supply wound on a rotary electric conducting member having a peripheral insulating member along its length upon which the strand is wound, means for driving said strand drawing means including electric motive means and an operating circuit for said motive means, a normally closed circuit including conducting means engaging the periphery of the strand supply arranged to move toward the periphery of the rotary member as the strand supply diminishes and to contact the insulating member thereon as exhaustion of the strand is approached thereby opening said circuit, and means including a solenoid and an operating circuit for said solenoid responsive to the opening thereof to effect an opening of the motor operating circuit and thereby a stoppage of said driving means.

3. In a strand handling apparatus including means for drawing strand from a supply wound on a rotary member, means for driving said strand drawing means including electric motive means and an operating circuit for said motive means, a movably mounted element engaging the periphery of the wound strand supply, said element arranged to move toward the periphery of the rotary member as exhaustion of the strand supply is approached and finally to contact a surface thereon upon which the strand supply is wound, and means responsive to the contacting of the element with said surface to effect an opening of the motor operating circuit and thereby a stoppage of said driving means.

4. In a strand handling apparatus including means for drawing strand from a supply wound on a rotary member, means for driving said strand drawing means including electric motive means and an operating circuit for said motive means, a brake member, a movably mounted element engaging the periphery of the wound strand supply, said element arranged to move toward the periphery of the rotary member as exhaustion of the strand supply is approached and finally to contact a surface thereon upon which the strand supply is wound, and means responsive to the contacting of the element with said surface to effect an opening of the motor operating circuit and thereby a stoppage of said driving means and apply the brake member against the strand driving means.

5. In a strand handling apparatus including means for drawing strand from a supply wound on a rotary electric conducting member, means for driving said strand drawing means including electric motive means and an operating circuit for said motive means, a circuit including the rotary electric conducting member and a movable electric conducting means engaging the periphery of the wound strand supply, said conducting means arranged to move toward the periphery of the rotary conducting member as the strand supply diminishes and finally to contact a surface thereon upon which the strand supply is wound as exhaustion of the strand is approached to control said latter circuit, and means responsive thereto to open said motor circuit and effect a stoppage of said driving means.

FRANK MARTINDELL.